United States Patent
Lee et al.

(10) Patent No.: US 9,442,318 B2
(45) Date of Patent: Sep. 13, 2016

(54) LIQUID CRYSTAL DISPLAY DEVICE

(71) Applicant: LG Display Co., Ltd., Seoul (KR)

(72) Inventors: Hyo Sung Lee, Jecheon-si (KR); Se Min Lee, Seoul (KR); Yong Joong Yoon, Paju-si (KR); Tae Hyung Kim, Gimpo-si (KR); Sun Bok Song, Ansan-si (KR)

(73) Assignee: LG Didplay Co., Ltd., Seoul (KR)

( * ) Notice: Subject to any disclaimer, the term of this patent is extended or adjusted under 35 U.S.C. 154(b) by 28 days.

(21) Appl. No.: 14/525,119

(22) Filed: Oct. 27, 2014

(65) Prior Publication Data

US 2015/0168769 A1    Jun. 18, 2015

(30) Foreign Application Priority Data

Dec. 12, 2013 (KR) ........................ 10-2013-0154657

(51) Int. Cl.
*G02F 1/1333* (2006.01)

(52) U.S. Cl.
CPC ................... *G02F 1/133308* (2013.01); *G02F 2001/13332* (2013.01); *G02F 2201/46* (2013.01); *G02F 2202/28* (2013.01)

(58) Field of Classification Search
CPC ............... G02F 1/133308; G02F 2001/13332; G02F 2201/46; G02F 2202/28
USPC ........... 349/58, 60; 362/97.1, 606, 608, 611, 362/632
See application file for complete search history.

(56) References Cited

U.S. PATENT DOCUMENTS

| | | | |
|---|---|---|---|
| 2002/0067591 A1 | 6/2002 | Tajima | |
| 2003/0058380 A1* | 3/2003 | Kim | G02F 1/133308 349/58 |
| 2005/0018101 A1* | 1/2005 | Choi | G02F 1/133308 349/58 |
| 2006/0066768 A1 | 3/2006 | Lee et al. | |
| 2007/0273809 A1 | 11/2007 | Lee | |
| 2008/0239195 A1* | 10/2008 | Nishio | G02F 1/133308 349/58 |
| 2009/0237586 A1* | 9/2009 | Han | G02F 1/133308 349/58 |
| 2010/0128194 A1* | 5/2010 | Cho | G02F 1/133615 349/58 |
| 2010/0128198 A1* | 5/2010 | Kim | G02B 6/0088 349/61 |
| 2011/0044071 A1* | 2/2011 | Cho | G02F 1/133608 362/606 |

(Continued)

FOREIGN PATENT DOCUMENTS

| | | |
|---|---|---|
| CN | 101079330 A | 11/2007 |
| CN | 203324614 U | 12/2013 |

(Continued)

OTHER PUBLICATIONS

United Kingdom Intellectual Property Office, Combined Search and Examination Report, UK Patent Application No. GB 1421745.9, Jun. 3, 2015, five pages.
Taiwan Intellectual Property Office, Office Action, Taiwanese Patent Application No. 103136666, Sep. 14, 2015, thirteen pages.

*Primary Examiner* — Donald Raleigh
*Assistant Examiner* — Kevin Quarterman
(74) *Attorney, Agent, or Firm* — Fenwick & West LLP

(57) ABSTRACT

An LCD device is disclosed that includes: a liquid crystal display panel; a backlight unit configured to apply light to the liquid crystal display panel; a top case configured to protect the liquid crystal display panel and including a plurality of case members; and a plurality of joint members arranged in joint regions of the case members.

20 Claims, 9 Drawing Sheets

(56) References Cited

U.S. PATENT DOCUMENTS

2011/0134346 A1* 6/2011 Hayashi ............ G02F 1/133308
  348/790
2011/0292315 A1* 12/2011 Bae ................... G02B 6/0088
  349/58
2013/0321740 A1 12/2013 An et al.
2015/0293292 A1* 10/2015 Lee ................... G02B 6/0026
  362/608

FOREIGN PATENT DOCUMENTS

| EP | 2 650 718 A1 | | 10/2013 |
|---|---|---|---|
| GB | 2 427 299 A | | 12/2006 |
| JP | 2005-017397 A | | 1/2005 |
| KR | 10-2013-0106119 A | | 9/2013 |
| KR | 20130106119 A | * | 9/2013 |
| TW | M268885 | | 6/2005 |

* cited by examiner

LIQUID CRYSTAL DISPLAY DEVICE

The present application claims priority under 35 U.S.C. §119(a) to Korean Patent Application No. 10-2013-0154657, filed on Dec. 12, 2013, which is hereby incorporated by reference in its entirety.

BACKGROUND

1. Field of the Disclosure

The present application relates to a liquid crystal display device.

2. Description of the Related Art

As information technology becomes more advanced, display devices with various, gradually improving features are being developed. In accordance therewith, a variety of slim, lightweight flat panel display devices with features that consume less power than cathode ray tube (CRT) devices are being researched and used in various devices. Flat panel display devices include liquid crystal display (LCD) devices, plasma display panels (PDP), organic light emitting diode (OLED) display devices, and so on. Among the flat panel display devices, the LCD devices have advantages of small size, light weight, slimness and low driving voltage. As such, the LCD devices are widely used at the present time.

An LCD device includes an LCD panel and a backlight unit applying light to the LCD panel. Also, an LCD device includes a top case disposed on the front surface of the LCD panel and a cover formed to encompass the entire surface of the top case.

In order to reduce the thickness of the LCD device and the step height between the LCD panel and a bezel region, the cover is removed from the LCD device. In this case, the top case is externally exposed and used as an exterior of the LCD device.

The top case is formed by jointing four case members each having a straight shape. However, when the top case is used as the exterior of the LCD device, a gap can be generated in a joint portion of the case members.

The gap generated in the joint portion mars the exterior of the LCD device. Also, the gap of the joint portion allows the case members to be easily separated from one another by an external impact.

SUMMARY

Accordingly, embodiments of the present application are directed to an LCD device that substantially obviates one or more of problems due to the limitations and disadvantages of the related art.

The embodiments provide an LCD device adapted to eliminate or reduce gaps and step height in joint portions of plural case members.

Additional features and advantages of the embodiments will be set forth in the description that follows, and in part will be apparent from the description, or may be learned by practice of the embodiments. The advantages of the embodiments will be realized and attained by the structure particularly pointed out in the written description and claims hereof as well as the appended drawings.

According to a general aspect of the present embodiment, an LCD device includes: a liquid crystal display panel; a backlight unit configured to apply light to the liquid crystal display panel; a top case configured to protect the liquid crystal display panel and including a plurality of case members; and a plurality of joint members arranged in joint regions of the case members.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION

Figure 1:
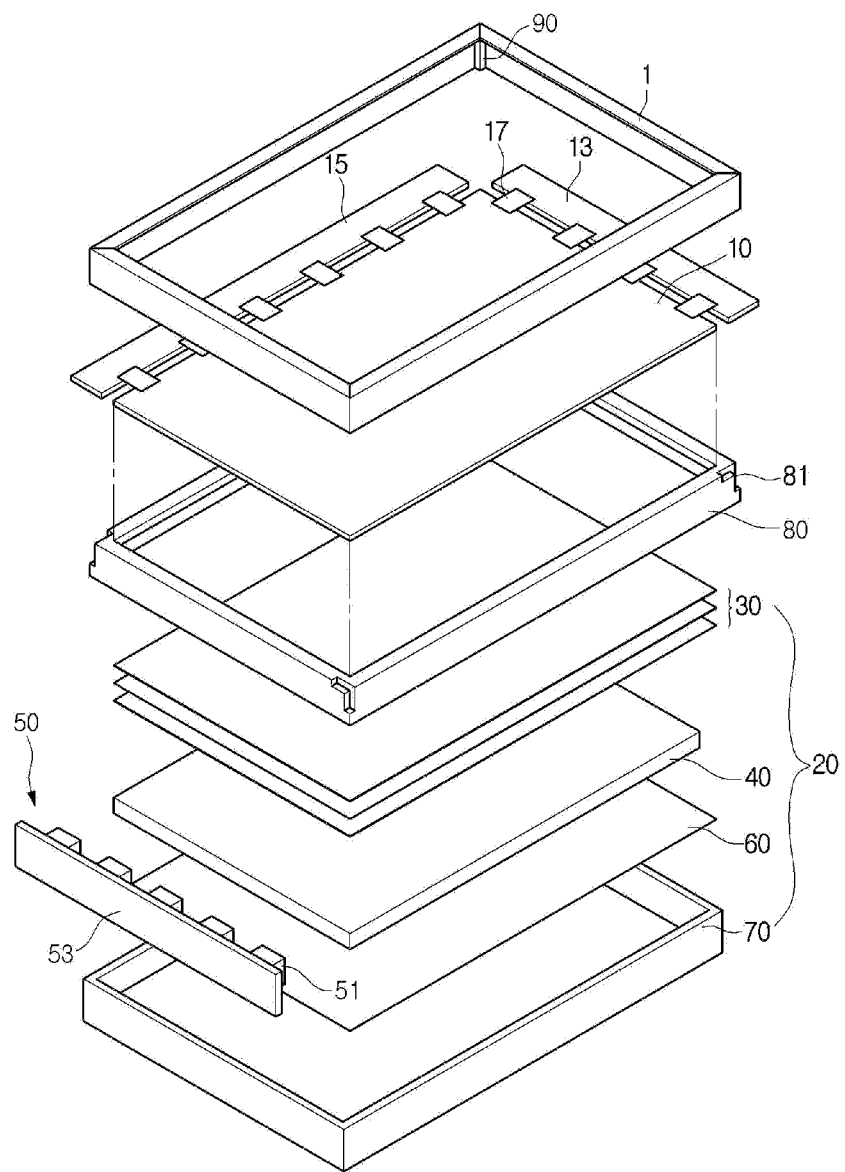
FIG. 1 is an exploded perspective view showing an LCD device according to a first embodiment of the present disclosure.

Reference will now be made in detail to embodiments of the present disclosure, examples of which are illustrated in the accompanying drawings. These embodiments introduced hereinafter are provided as examples in order to convey their spirit to the ordinary skilled person in the art. Therefore, these embodiments might be embodied in a different shape, so are not limited to these embodiments described here. In the drawings, the size, thickness, and so on of a device can be exaggerated for convenience of explanation. Wherever possible, the same reference numbers will be used throughout this disclosure including the drawings to refer to the same or like parts.

A liquid crystal display device according to an embodiment of the present disclosure includes: a liquid crystal display panel; a backlight unit configured to apply light to the liquid crystal display panel; a top case configured to protect the liquid crystal display panel, where the top case includes a plurality of case members; and a plurality of joint members arranged in joint regions of the plurality of case members.

The plurality of the joint members can be combined with the plurality of case members.

The plurality of joint members can be combined with the plurality of case members by a plurality of fixation members.

The fixation member can be a screw.

The joint member can be formed in the shape of an 'L'.

The joint member can be formed in a rectangular hexahedron shape.

The joint member can be formed from a metal material.

The liquid crystal display device can further include a plurality of joint plates interposed between the joint members and the case members.

The case member can include a vertical plane and a horizontal plane, and a joint plate can be interposed between the joint member and the horizontal plane of the case member.

The vertical and horizontal planes of the case member can be formed at a thickness of about 1.5 mm (millimeters).

The joint plate can be formed at a thickness of about 0.3 mm.

The joint plate can be attached to the case member by an adhesive.

One surface of the joint member can be coated with an adhesive.

The joint member can be attached to the case member by the adhesive.

The liquid crystal display device can further include a guide panel configured to support the liquid crystal display panel and include a receiving portion, which is formed to receive the joint member.

The receiving portion can be formed in an intaglio shape opposite to the joint member.

The top case can be formed in a curved surface shape.

The plurality of the case members include first through fourth case members. The first and third case members can have a fixed curvature.

The second and fourth case members can be formed in a straight shape.

The top case can be used as an exterior of the liquid crystal display device.

FIG. 1 is an exploded perspective view showing an LCD device according to a first embodiment of the present disclosure.

Referring to FIG. 1, the LCD device according to a first embodiment of the present disclosure includes: an LCD panel 10 configured to display images; and a backlight unit 20 configured to apply light to the LCD panel 10. The backlight unit 20 is disposed under the LCD panel 10.

Also, the LCD device includes: a top case 1 configured to encompass edges of the upper surface of the LCD panel 10 and combined with the backlight unit 20; a guide panel 80 configured to support edges of the lower surface of the LCD panel 10 and combined with the backlight unit 20; and a bottom cover 70 configured to receive the backlight unit 20.

The top case 1 can be formed opposite to the edges of the LCD panel 10 and has an open central region. Such a top case 1 can be used to support the LCD panel 10 and to protect the LCD panel 10 from external impact. Also, the top case 1 can be formed from a metal material such as stainless steel or SUS (steel use stainless).

In one embodiment, no additional cover is attached to the front surface of the top case 1. In this case, the top case 1 can be used as an exterior of the LCD device. As such, the top case 1 can be directly viewed by users.

In other words, the top case 1 can be formed in a rectangular rim shape. A joint member 90 can be combined with a corner of the top case 1. In detail, the joint member 90 can be disposed in an inner side of a corner of the top case 1.

The guide panel 80 can be formed to have an open central region. As such, the guide panel 80 can allow light emitted from the backlight unit to illuminate the LCD panel 10. Such a guide panel 80 can be formed as a rectangular rim. Also, the guide panel 80 can be formed from a mold material.

A receiving portion 81 is formed in the guide panel 80. In detail, the receiving portion 81 can be formed in a corner of the guide panel 80. More specifically, the receiving portion 81 can be formed in an outer corner of the guide panel 80.

The receiving portion 81 can be formed in the guide panel 80 opposite to the joint member 90. Also, the receiving portion 81 can be formed in a depressed shape suitable to receive the joint member 90. In other words, the receiving portion 81 can be formed in an opposite shape to the joint member 90. For example, the receiving portion 81 can be formed in the shape of an 'L'.

A gate PCB (Printed Circuit Board) 13 can be disposed beside an edge of the LCD panel 10, and a data PCB 15 can be disposed beside another edge of the LCD panel 10. The gate PCB 13 is used to apply gate signals to gate lines, and the data PCB 15 is used to apply data voltages to data lines. Although not shown in the drawing, the gate PCB 13 and the data PCB 15 can be formed as a single body united with each other.

A plurality of flexible printed circuit boards (FPCBs) 17 can be arranged between the gate and data PCBs 13 and 15 and the LCD panel 10. The gate PCB 13 can be connected to gate lines on the LCD panel 10 through some FPCBs 17, and the data PCB 15 can be connected to the data lines on the LCD panel 10 through other FPCBs 17.

A driver IC (Integrated Circuit) chip (not shown) can be loaded on each of the FPCBs 17. The driver IC chip can be one of a gate driver and a data driver.

The backlight unit 20 can include optical sheets 30, a light guide plate 40, a light source 50, and a reflective plate 60.

The optical sheets 30 can be stacked between the LCD panel 10 and the light guide plate 40. The optical sheets 30 diffuse and concentrate light from the light guide plate 40 and transfer diffused and concentrated light to the LCD panel 10. Such optical sheets can include a prism sheet, a diffusive sheet, and so on.

The light guide plate 40 can be disposed under the optical sheets 30. The light guide plate 40 converts light emitted from the light source 50 into two-dimensional light and outputs two-dimensional light toward the LCD panel 10. Such a light guide plate 40 can be formed from one selected from a material group that includes PMMA (polymethylmethacrylate), vinyl chloride, an acrylic resin, a PC (polycarbonate)-based resin, a PET (polyethylene terephthalate)-based resin, a PE (polyethylene)-based resin, a PS (polystyrene)-based resin, a PP (polypropylene)-based resin, a PI (polyimide)-based resin, glass, silica, and so on.

The light source 50 can include a plurality of light emitting diodes (LEDs) 51 and a PCB 53.

The LEDs 51 are loaded on the PCB 53. Each of the LEDs 51 is driven by a voltage applied from the PCB 53. Also, each of the LEDs 51 generates light and outputs the generated light toward the light guide plate 40.

The PCB 53 can receive a driving voltage from an external driver (not shown). Also, the PCB 53 can transfer the driving voltage to the LEDs 51.

The reflective plate 60 can be interposed between the light guide plate 40 and the bottom cover 70. Such a reflective plate 60 can used to reflect light from the light guide plate 40 and transfer reflected light toward the light guide plate 40 and the LCD panel 10.

Figure 2:
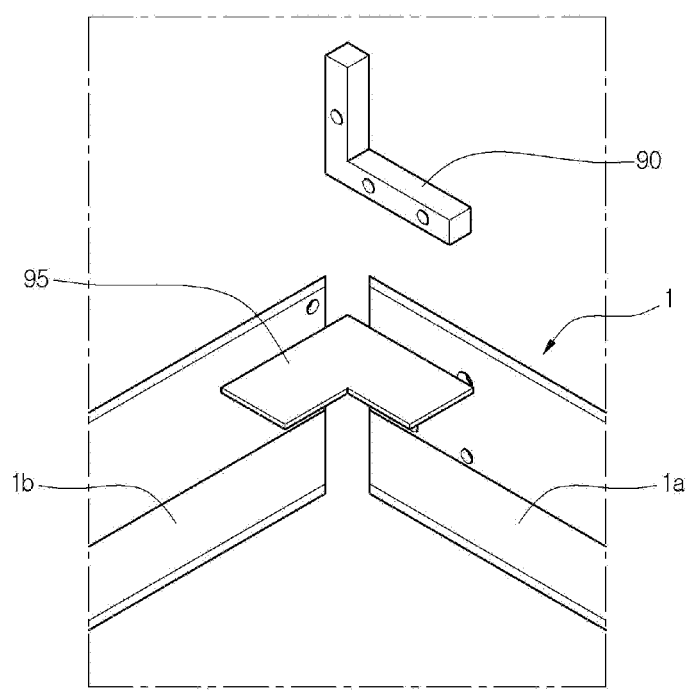
FIG. 2 is an enlarged perspective view showing a corner portion of a top case according to a first embodiment of the present disclosure.
Figure 3A:
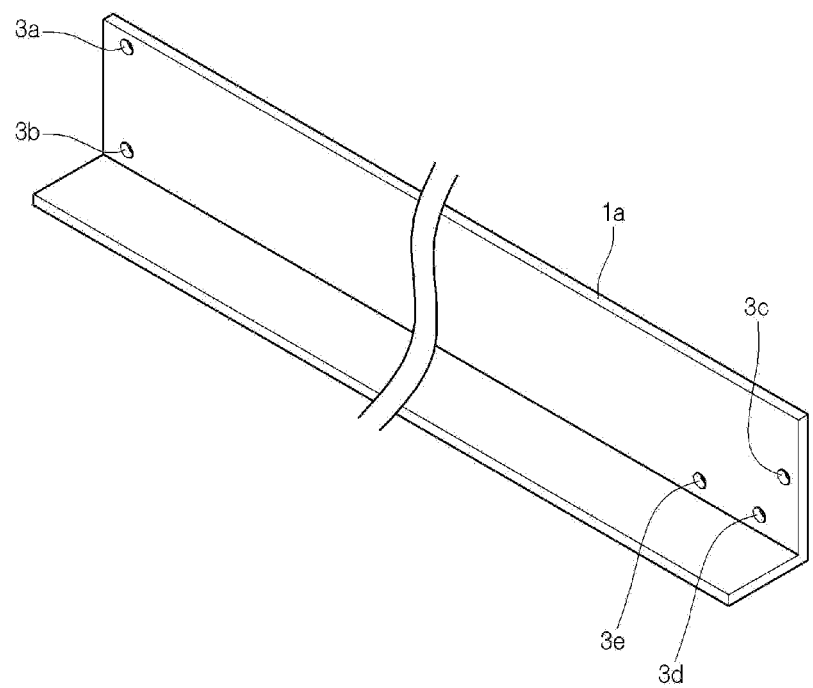
FIGS. 3A through 3C are perspective views showing a case member, a joint member, and a joint plate according to an embodiment of the present disclosure.
Figure 3B:
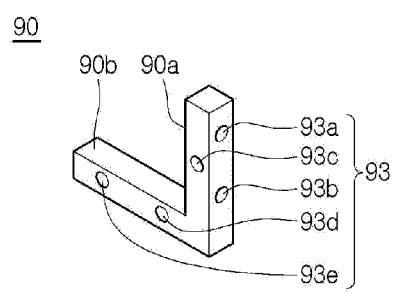
Figure 3C:
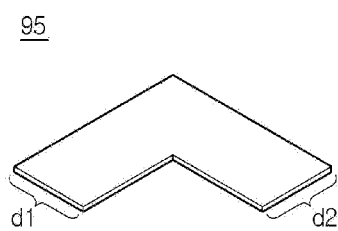

FIG. 2 is an enlarged perspective view showing a corner portion of the top case 1 according to a first embodiment of the present disclosure. FIGS. 3A through 3C are perspective views showing a case member 1a, a joint member 90, and a joint plate 95 according to an embodiment of the present disclosure.

As shown in FIGS. 2 and 3, the top case 1 according to a first embodiment of the present disclosure can include a plurality of case members.

The rectangular top case 1 can be formed by combining the plurality of case members each having a straight shape. For example, the top case 1 can include four case members. In other words, the top case 1 can include first through fourth case members. As such, the top case 1 can be formed by jointing the first through fourth case members.

One end of the first case member 1a is jointed with one end of the second case member 1b. The other end of the second case member 1b is jointed with one end of the third case member. The other end of the third case member is jointed with one end of the fourth case member. The other end of the fourth case member is jointed with the other end of the first case member 1a.

The first through fourth case members can be jointed with one another using the same jointing method. As such, the joint of the first and second case members 1a and 1b shown in the drawings will be described as an example.

The first and second case members 1a and 1b can be combined in a sectional shape of 'L' with a horizontal plane and a vertical plane. The vertical and horizontal planes included in each of the first and second case members 1a and 1b can be perpendicular to each other. Also, the vertical and horizontal planes included in each of the first and second case members 1a and 1b can be formed in a single body united with each other. Such vertical and horizontal planes can be formed at a thickness of about 1.5 mm.

The first and second case members 1a and 1b can be formed from a metal material. For example, the first and second case members 1a and 1b can be formed from stainless steel or SUS (Steel Use Stainless).

A plurality of case engaging holes 3 can be formed in each of the first case member 1a.

The plurality of case engaging holes 3 can be formed in the vertical plane of the first case member 1a. Also, the plurality of case engaging holes 3 can be formed in both end regions of the first case member 1a. In detail, the plurality of case engaging holes 3 can be formed in both end regions of the vertical plane of the first case member 1a.

Each of the case engaging holes 3 can be formed in such manner as to penetrate through the first or second case member 1a or 1b. Also, each of the case engaging holes 3 can be formed in a circular shape.

The plurality of case engaging holes 3 can include first through fifth case engaging holes 3a through 3e. The first and second case engaging holes 3a and 3b can be formed in one end region of the first case member 1a. The third through fifth case engaging holes 3c through 3e can be formed in the other end region of the first case member 1a.

Also, the first and second case engaging holes 3a and 3b can be formed in a region of the first case member 1a adjacent to the second case member 1b. The third through fifth case engaging holes 3c through 3e can be formed in another region of the first case member 1a adjacent to the fourth case member.

The first and second case engaging holes 3a and 3b can be formed a region of the vertical plane of the first case member 1a adjacent to the second case member 1b in such a manner as to be parallel to the end line of the vertical plane of the first case member 1b. The fourth and fifth case engaging holes 3d and 3e can be formed in another region of the vertical plane of the first case member 1a adjacent to the fourth case member in such manner as to be parallel to the horizontal plane of the first case member 1a.

The joint member 90 can include a vertical portion 90a and a horizontal portion 90b. Also, the joint member 90 can be formed in the shape of an 'L' by combining the vertical portion 90a and the horizontal portion 90b.

The vertical portion 90a and the horizontal portion 90b can be combined perpendicularly to each other. Also, the vertical portion 90a and the horizontal portion 90b can be formed in a single body united with each other. Moreover, the vertical portion 90a and the horizontal portion 90b can be formed from a metal material. Furthermore, the vertical portion 90a and the horizontal portion 90b can each be formed in a rectangular rod shape.

A plurality of fastener holes 93 can be formed in the joint member 90. Each of the fastener holes 90 can be formed in such a manner as to penetrate through the joint member 90. The plurality of fastener holes 93 can be formed in the joint member 90 opposite to the plurality of case engaging holes 3.

Such fastener holes 93 can include first through fifth fastener holes 93a through 93e. The first through third fastener holes 93a through 93c can be formed in the vertical portion 90a. The fourth and fifth fastener holes 93d and 93e can be formed in the horizontal portion 90b.

The first and second fastener holes 93a and 93b can be formed in the rear surface of the vertical portion 90a. The third fastener hole 93c can be formed in one side surface of the vertical portion 90a. The fourth and fifth fastener holes 93d and 93e can be formed in one side surface of the horizontal portion 90b. Alternatively, the third fastener hole 93c can be formed in the same surface as the fourth and fifth fastener holes 93d and 93e.

In other words, the first and second fastener holes 93a and 93b can be formed in the rear surface of the joint member 90. The third through fifth fastener holes 93c through 93e can be formed in one side surface of the joint member 90.

The joint plate 95 can be a metal plate. Also, the joint plate 95 can be formed in the shape of an 'L' with first and second wing planes combined perpendicularly to each other. The joint plate 95 can be formed thinner than the horizontal plane of the case member. For example, the joint plate 95 can be formed at a thickness of about 0.3 mm.

A first width d1 of the first wing plane of the joint plate 95 can be the same as that of the horizontal plane of the first case member 1a. A second width d2 of the second wing plane of the joint plate 95 can be the same as that of the horizontal plane of the second case member 1b.

The first case member 1a can have the same size as the second case member 1b. As such, the first width d1 can be the same as the second width d2.

An adhesive can be coated on one surface of the joint plate 95. The adhesive 95 enables the joint plate 95 to be attached to the horizontal planes of the case members. For example, the joint plate 95 can be attached to the horizontal planes of the first and second case members 1a and 1b.

FIGS. 4A through 4D are perspective views illustrating a procedure for combining the case member, the joint member, and the joint plate according to a first embodiment of the present disclosure.

Figure 4A:
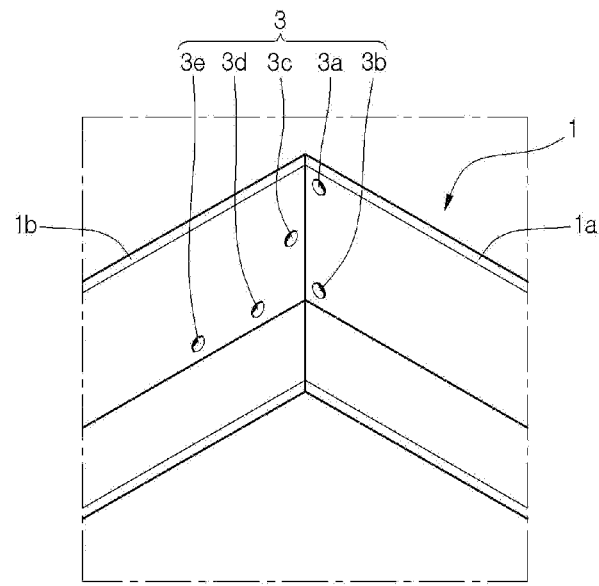
FIGS. 4A through 4D are perspective views illustrating a procedure for combining the case member, the joint member, and the joint plate, according to a first embodiment of the present disclosure.

The first through fourth case members are arranged perpendicularly to one another in such a manner as to form a rectangular loop. For example, the first and second case members 1a and 1b are arranged perpendicularly to each other as shown in FIG. 4A.

In detail, one end of the horizontal plane of the first case member 1a is connected perpendicularly to one end of the horizontal plane of the second case member 1b. Also, one end of the vertical plane of the first case member 1a is connected perpendicularly to one end of the vertical plane of the second case member 1b.

Figure 4B:
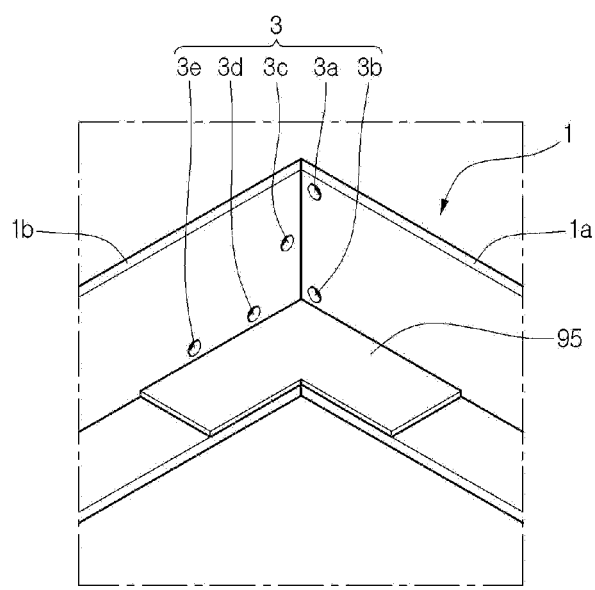

As shown in FIG. 4B, the joint plate 95 is placed on end regions of the horizontal planes of the first and second case members 1a and 1b adjacent to each other.

The joint plate 95 is attached to the end regions of the horizontal planes of the first and second case members 1a and 1b adjacent to each other by the adhesive coated on one surface (i.e., a lower surface) of the joint plate 95.

The first width d1 of the first wing of the joint plate 95 can be the same as that of the horizontal plane of the first case member 1a. The second width d2 of the second wing of the joint plate 95 can be the same as that of the horizontal plane of the second case member 1b. As such, the joint plate 95 is not exposed to the front direction of the top case 1.

Figure 4C:
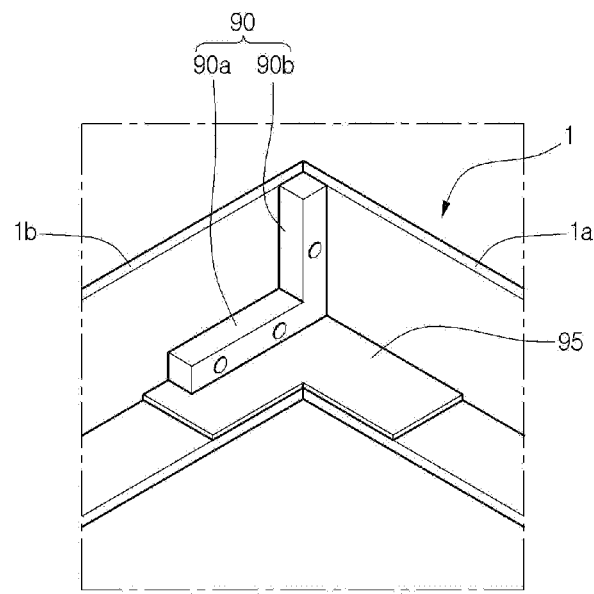

As shown in FIG. 4C, the joint member 90 is disposed in contact with the joint plate 95 and the two case members 1a and 1b.

The joint member 90 can be placed in a jointing region of the first and second case members 1a and 1b. Also, the joint member 90 is disposed in such a manner that the fastener holes 93 are opposite to, and aligned with, the case engaging holes 3.

The first fastener hole 93a can be opposite to the first case engaging hole 3a of the first case member 1a. The second fastener hole 93b can be opposite to the second case engaging hole 3b of the first case member 1a.

The third fastener hole 93c can be opposite to the third case engaging hole 3c of the second case member 1b. The fourth fastener hole 93d can be opposite to the fourth case engaging hole 3d of the second case member 1b. The fifth fastener hole 93e can be opposite to the fifth case engaging hole 3e of the second case member 1b.

Figure 4D:
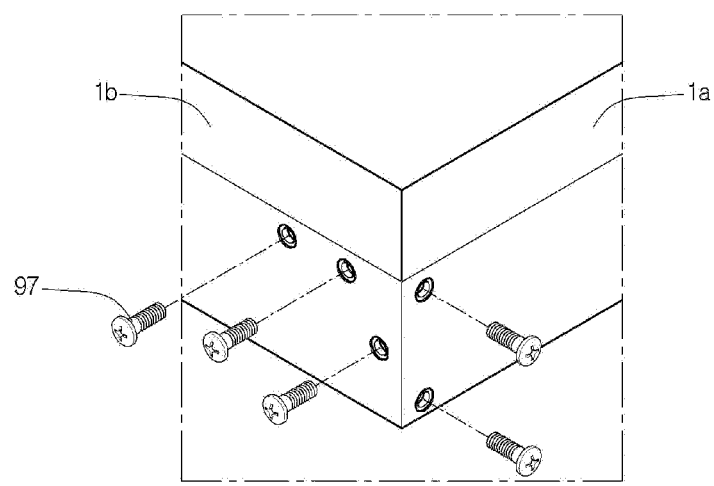

The joint member is combined with the two case members, as shown in FIG. 4D.

The joint member 90 can be combined with the two case members by means of fixation members 97. The fixation member 97 is inserted from the outer surface of the respective case member into the joint member 90 and is engaged with the case member and the joint member 90. In detail, each of the fixation members 97 can be inserted into the respective fastener hole 93 through the respective case engaging hole 3.

The fixation member 97 can be a screw.

The first and second case members 1a and 1b are primarily connected (or jointed) with each other by means of the joint plate 95, and then combined with the joint member 90. As such, the efficiency of combining the case members 1a and 1b can be enhanced.

In other words, after the first and second case members 1a and 1b are primarily connected to each other by means of the joint plate 95 coated with the adhesive, the joint member 90 is combined with the first and second case members 1a and 1b using the fixation members 97. As such, the case members 1a and 1b can be easily jointed with one another. Also, the efficiency of combining the case members 1a and 1b can be enhanced.

Also, joining the case members 1a and 1b using the joint member 90 can prevent a gap that can occur between ends of the case members 1a and 1b due to mechanical tolerances such as length deviation or warping of the case member 1a or 1b.

Although the top case 1 is used as the exterior of the LCD device without an additional covering, the joint member 90 can prevent the generation of a gap in the corner of the top case 1. Therefore, the exterior of the LCD device can be improved.

Figure 5:
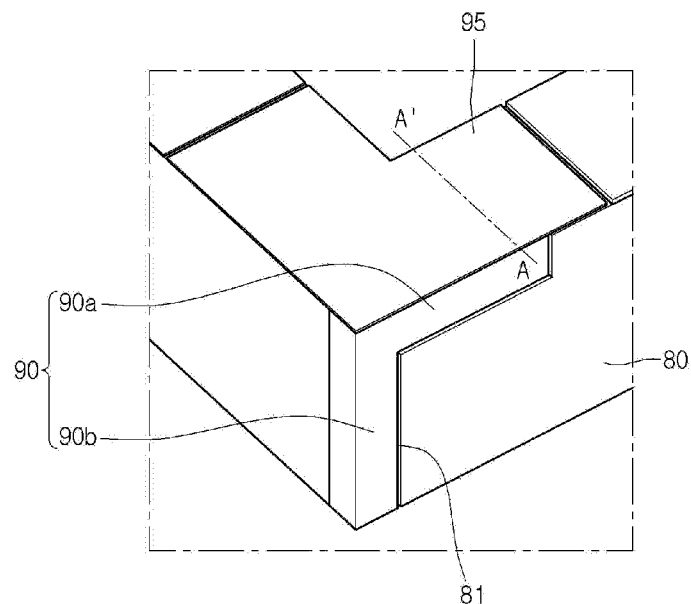
FIG. 5 is a perspective view showing a combination of the joint member and the joint plate with a guide panel according to a first embodiment of the present disclosure.
Figure 6:
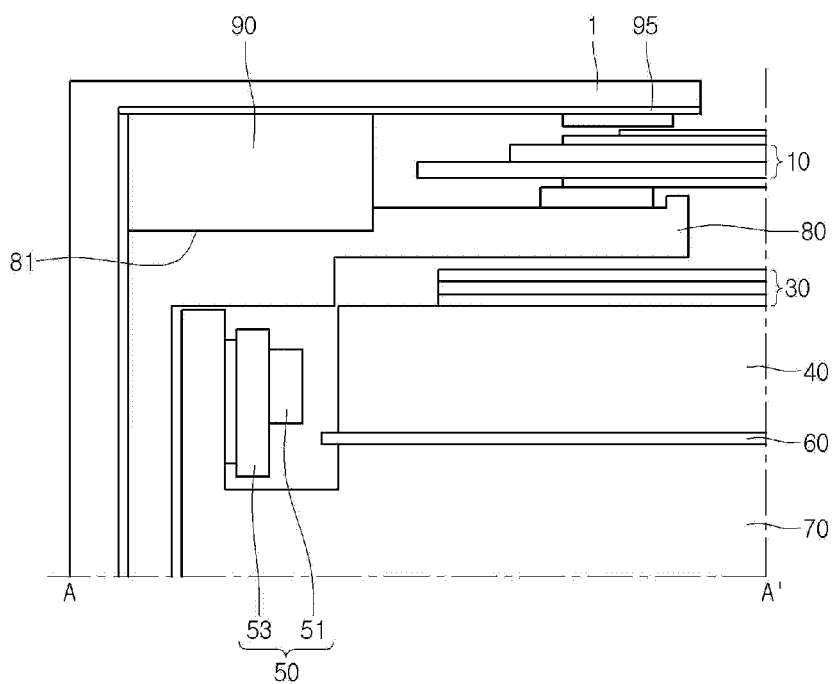
FIG. 6 is a cross-sectional view of an LCD device along the line A-A' in FIG. 5.

FIG. 5 is a perspective view showing a combination of the joint member 90 and the joint plate 95 with a guide panel 80 according to a first embodiment of the present disclosure. FIG. 6 is a cross-sectional view showing an LCD device taken along a line A-A' in FIG. 5.

Referring to FIGS. 5 and 6, the LCD device according to a first embodiment of the present disclosure includes a rectangular bottom cover 70.

A light source 50 is disposed on one inner side surface of the bottom cover 70. The light source 50 can include a plurality of LEDs 51 and a PCB 53. Although the light source 50 is disposed on the inner side surface of the bottom cover 70 as shown in the drawings, it is not limited to this. Alternatively, the light source 50 can be disposed on the bottom surface of the bottom cover 70. In another different manner, the light source can be installed in such a manner as to be combined with a separated housing.

A reflective plate 60, a light guide plate 40, and optical sheets 30 are sequentially stacked on the bottom surface of the bottom cover 70. Also, a guide panel 80 is interposed between the bottom cover 70 and the LCD panel 10.

A receiving portion 81 is formed in the guide panel 80. The receiving portion 81 is used to receive the joint member 90. To this end, the receiving portion 81 can be formed as an opposite shape to the joint member 90. In other words, the receiving portion 81 can be formed in an intaglio shape suitable to receive the joint member 90.

Since the joint member 90 is received into the receiving portion 81, which is formed in the guide panel 80, the top case 1 can be combined with the guide panel 80 without any additional space. As such, the LCD device can become thinner and the bezel can be reduced (or removed).

A joint plate 95 is disposed on the joint member 90. The joint plate 95 can be attached to the top case 1. In detail, the joint plate 95 can be attached to the horizontal plane of the top case 1. The joint plate 95 can have a thickness of about 0.3 mm, and the horizontal plane of the top case 1 can have a thickness of about 1.5 mm.

A step height may be generated between the top case 1 and the LCD panel 10. The step height between the front surfaces of the top case 1 and the LCD panel 10 can be defined as a border gap.

The LCD device according to a first embodiment of the present disclosure uses the top case 1 as its exterior without disposing an additional covering on the front surface of the top case 1. Due to this, the border gap 1 is largely affected by thicknesses of the top case 1 and the joint plate 95.

However, the LCD device according to a first embodiment of the present disclosure employs the joint plate 95 with a thickness of about 0.3 mm. As such, the joint plate 95 can remove (or reduce) the step height between the case members and reduce the border gap.

Figure 7A:
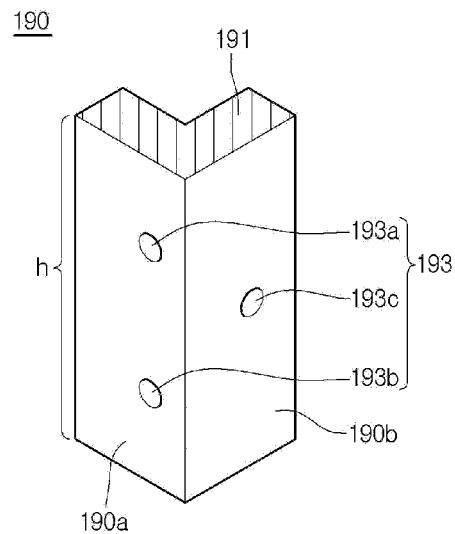
FIGS. 7A and 7B are perspective views showing a top case and a joint member of an LCD device according to a second embodiment of the present disclosure.
Figure 7B:
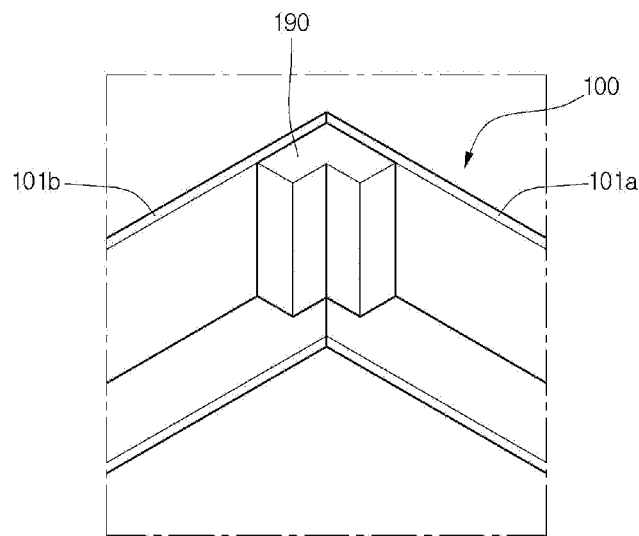

FIGS. 7A and 7B are perspective views showing a top case 101 and a joint member 190 of an LCD device according to a second embodiment of the present disclosure.

The LCD device of the second embodiment has the same configuration as that of the first embodiment except that the joint member 190 has a different shape. Components of the second embodiment having the same function and shape as those of the first embodiment will be referred to by the same reference numbers and names. Also, the description of the second embodiment overlapping with the first embodiment in the effect will be omitted.

Referring to FIGS. 7A and 7B, a top case 101 of the LCD device according to a second embodiment of the present disclosure includes a first case member 101a and a second case member 101b.

A joint member 190 can be disposed in a joint region of the first and second case members 101a and 101b.

The joint member 190 can be formed in a pillar structure with an 'L' cross-sectional shape. In detail, the joint member 190 can be formed by combining first and second wing portions 190a and 190b, which each have a rectangular hexahedron shape. The first wing portion 190a and the second wing portion 190b can be combined perpendicularly to each other.

The first wing portion 190a of the joint member 190 can come in contact with the first case member 101a. The second wing portion 190b of the joint member 190 can come in contact with the second case member 101b. In detail, the first wing portion 190a of the joint member 190 can contact the vertical plane of the first case member 101a. The second wing portion 190b of the joint member 190 can contact the vertical plane of the second case member 101b.

The height h of the first wing portion 190a can be the same as that of the vertical plane of the first case member 101a. The second wing portion 190b can have the same height as the first wing portion 190a. The vertical plane of the second case member 101b has the same height as the vertical plane of the first case member 101a. Therefore, the second wing portion 190b of the joint member 190 has the same height as the vertical plane of the second case member 101b.

The joint member 190 is formed to have the same height as the vertical plane of the case member. As such, the generation of a gap in the corner region of the top case 101 can be prevented.

The first wing portion 190a and the second wing portion 190b can be formed in a single body united with each other. Also, the first wing portion 190a and the second wing portion 190b can be formed from a metal material.

A plurality of fastener holes 193 is formed in the joint member 190. For example, the plurality of fastener holes 103 can include first through third fastener holes 193a through 193c. The plurality of fastener holes 193 can be formed in the joint member 190 opposite to the case engaging holes 3a, 3b, and 3c of the top case 101.

The first fastener hole 193a and the second fastener hole 193b can be formed in the first wing portion 190a of the joint member 190. The third fastener hole 193c can be formed in the second wing portion 190b of the joint member 190. The first fastener hole 193a can be formed in the first wing portion 190a opposite the first case engaging hole 3a. The second fastener hole 193b can be formed in the first wing portion 190a opposite to the second case engaging hole 3b. The third fastener hole 193c can be formed in the second wing portion 190b opposite to the third case engaging hole 3c.

Although the first through third fastener holes 193a through 193c are shown in the drawings, the plurality of fastener holes 193 can further include fourth and fifth fastener holes opposite to the fourth and fifth case engaging holes 3d and 3e, like the first embodiment.

A plurality of fixation members penetrating through the respective case engaging holes 3 can be engaged with (or inserted into) the respective fastener holes 193.

Each of the fixation members is engaged with (or inserted into) the respective case engaging hole 3 and the respective fastener hole 193. As such, the joint member 190 is combined with the first and second case members 101a and 101b. In other words, the plurality of case members can be jointed with one another by the joint members 190 without generating any gap in their joint regions.

The lower surface of the joint member 190 can come in contact with the horizontal plane of the top case 101. An adhesive 191 can be coated on the lower surface of the joint member 190. In other words, the adhesive 191 can be coated on the lower surface of the joint member 190, which will come in contact with the horizontal plane of the top case 101.

The adhesive 191 can attach the joint member 190 to the horizontal plane of the top case 101. The lower surface of the joint member 190, which will be coated with the adhesive 191, is formed to have a planarized surface. Such a lower surface of the joint member 190 removes a step height, which can be generated between the first and second case members 101a and 101b.

This embodiment of the present disclosure allows the top case 101 to be used as an exterior of the LCD device. In this case, the removal of the step height can enhance the exterior of the LCD device.

Although it is not shown in the drawings, the receiving portion of the guide panel 80 can be modified opposite to the shape of the joint member 190. In other words, the receiving portion of the guide panel 80 can be formed in an intaglio shape, which is opposite to the joint member 190 and suitable to receive the joint member 190.

Figure 8A:
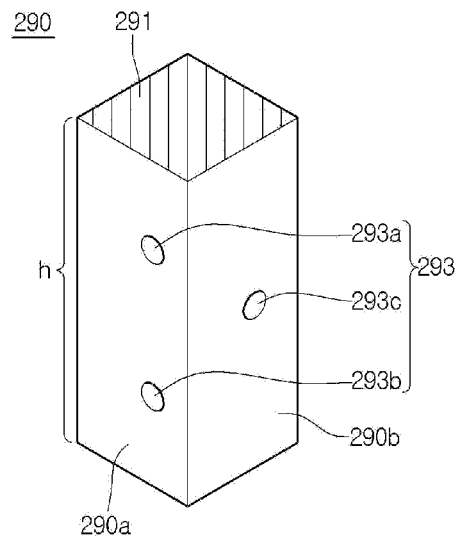
FIGS. 8A and 8B are perspective views showing a top case and a joint member of an LCD device according to a third embodiment of the present disclosure.
Figure 8B:
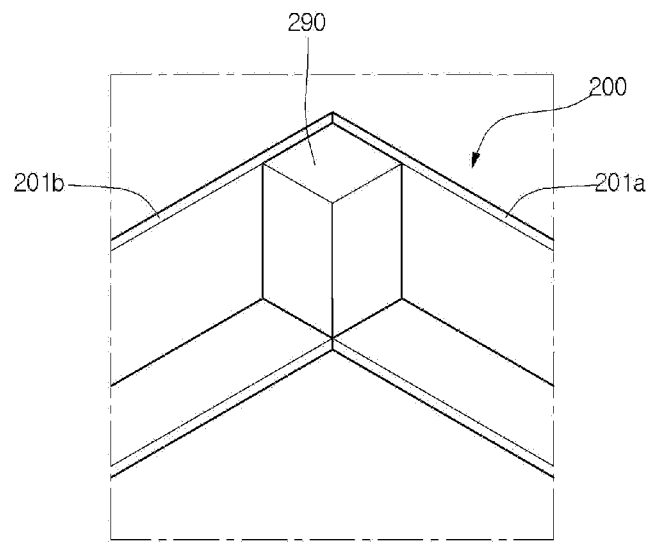

FIGS. 8A and 8B are perspective views showing a top case 201 and a joint member 290 of an LCD device according to a third embodiment of the present disclosure.

The LCD device of the third embodiment has the same configuration as that of the second embodiment except that the joint member 290 has a different shape. Components of the third embodiment having the same function and shape as those of the second embodiment will be referred to by the same reference numbers and names. Also, the description of the third embodiment overlapping with the second embodiment in effect will be omitted.

Referring to FIGS. 8A and 8B, a top case 201 of the LCD device according to a third embodiment of the present disclosure includes a first case member 201a and a second case member 201b.

A joint member 290 can be disposed in a joint region of the first case member 201a and the second case member 201b.

The joint member 290 can be formed in a rectangular hexahedron shape with four side surfaces, an upper surface, and a lower surface. As such, the joint member 290 can include a first side surface 290a and a second side surface 290*b*, which will be in contact with the case members 201*a* and 201*b*. The first side surface 290*a* and the second side surface 290*b* can be adjacent and perpendicular to each other.

The first side surface 290*a* of the joint member 290 can come in contact with the first case member 201*a*, and the second side surface 290*b* of the joint member 290 can come in contact with the second case member 201*b*. In detail, the first side surface 290*a* of the joint member 290 can come in contact with the vertical plane of the first case member 201*a*, and the second side surface 290*b* of the joint member 290 can come in contact with the vertical plane of the second case member 201*b*.

The first and second side surface 290*a* and 290*b* can have the same height as the vertical planes of the first and second case members 201*a* and 201*b*. In other words, the joint member 290 can be formed in the same height as the vertical planes of the case members 201*a* and 201*b*. As such, the generation of a gap in a corner of the top case 201 can be prevented.

A plurality of fastener holes 293 can be formed in the joint member 290. For example, the plurality of fastener holes 293 can include first through third fastener holes 293*a* through 293*c*. The plurality of fastener holes 293*a* through 293*c* can be formed in the joint member 290 opposite to the case engaging holes 3*a*, 3*b*, and 3*c* of the top case 201.

The first fastener hole 293*a* and the second fastener hole 293*b* can be formed in the first side surface 290*a*. The third fastener hole 293*c* can be formed in the second side surface 290*b*. In detail, the first fastener hole 293*a* can be formed in the first side surface 290*a* opposite to the first case engaging hole 3*a*. The second fastener hole 293*b* can be formed in the first side surface 290*a* opposite to the second case engaging hole 3*b*. The third fastener hole 293*c* can be formed in the second side surface 290*b* opposite to the third case engaging hole 3*c*.

Although the first through third fastener holes 293*a* through 293*c* are shown in the drawings, the plurality of fastener holes can further include fourth and fifth fastener holes opposite to the fourth and fifth case engaging holes 3*d* and 3*e*, like the first embodiment.

A plurality of fixation members each penetrating through the respective case engaging hole 3 can be engaged with (or inserted into) the plurality of fastener holes 293.

Each of the fixation members can be engaged with (or inserted into) the respective case hole 3 and the respective fastener hole 293. As such, the joint member 290 can be combined with the first and second case members 201*a* and 201*b*. In other words, the plurality of case members can be jointed with one another by the joint members 290 without generating any gap in their joint regions.

One of the upper and lower surfaces of the joint member 290 can come in contact with the horizontal plane of the top case 201. An adhesive 291 can be formed coated on one of the upper and lower surfaces of the joint member 290. In other words, the adhesive 291 can be coated on one of the upper and lower surfaces of the joint member, which will come in contact with the horizontal plane of the top case 201.

The adhesive 291 enables the joint member 290 to be attached to the horizontal plane of the top case 201. One of the upper and lower surfaces of the joint member, which will be coated with the adhesive 291 is formed to have a planarized surface. One of the upper and lower surfaces of the joint member 290 can prevent a step height, which can be generated between the first and second case members 201*a* and 201*b*.

This embodiment of the present disclosure allows the top case 201 to be used as an exterior of the LCD device. In this case, the removal of the step height can enhance the exterior of the LCD device.

Although it is not shown in the drawings, the receiving portion of the guide panel 80 can be modified opposite to the shape of the joint member 290. In other words, the receiving portion of the guide panel 80 can be formed in an intaglio shape, which is opposite to the joint member 190 and suitable to receive the joint member 290.

Figure 9A:
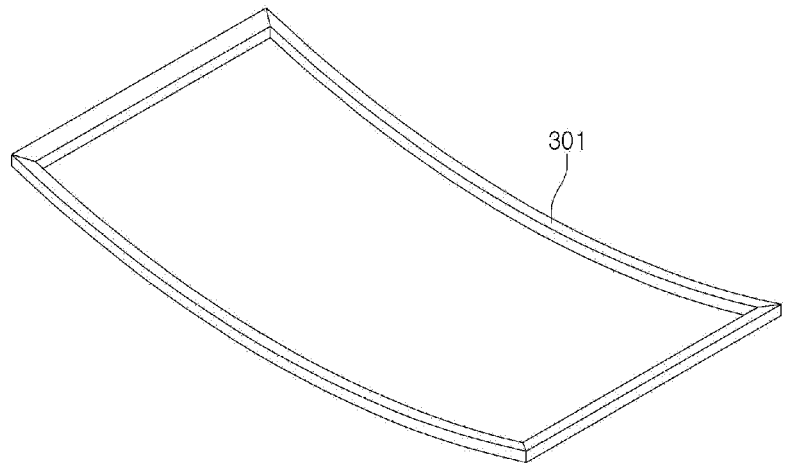
FIGS. 9A and 9B are perspective views showing a top case and a joint member of an LCD device according to a fourth embodiment of the present disclosure.
Figure 9B:
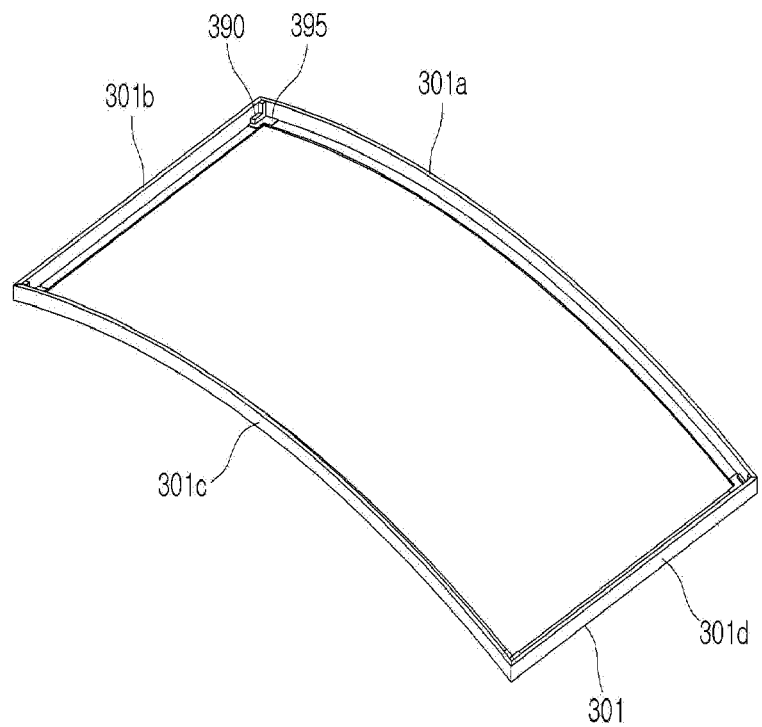

FIGS. 9A and 9B are perspective views showing a top case 301 and a joint member 390 of an LCD device according to a fourth embodiment of the present disclosure.

The LCD device of the fourth embodiment has the same configuration as that of the first embodiment with the exception of having a curved surface. Components of the fourth embodiment having the same function and shape as those of the first embodiment will be referred to by the same reference numbers and names. Also, the description of the fourth embodiment overlapping with the first embodiment in effect will be omitted.

Referring to FIGS. 9A and 9B, a top case 301 of the LCD device according to a fourth embodiment of the present disclosure can be formed in a curved surface shape with a fixed curvature.

Although only the top case 301 is shown in the drawings, all components of the LCD device can be curved in the same curvature as the top case 301.

The top case 301 can include a plurality of case members. For example, the top case 301 can include first through fourth case members 301*a* through 301*d*.

One end of the first case member 301*a* is connected (or jointed) with one end of the second case member 301*b*. The other end of the second case member 301*b* is connected (or jointed) with one end of the third case member 301*c*. The other end of the third case member 301*c* is connected (or jointed) with one end of the fourth case member 301*d*. The other end of the fourth case member 301*d* is connected (or jointed) with the other end of the first case member 301*a*.

The first case member 301*a* is opposite to the third case member 301*c*. The second case member 301*b* is opposite to the fourth case member 301*d*.

The first case member 301*a* and the second case member 301*c* can be formed in a curved shape. The second case member 301*b* and the fourth case member 301*d* can be formed in a straight shape. In other words, the first case member 301*a* and the third case member 301*c* can be curved in the fixed curvature.

A joint member 390 and a joint plate 395 can be disposed in each of the connection regions (or joint regions) of the plurality of case members. For example, the joint member 390 and the joint plate 395 can be placed in the connection region (or joint region) of the first and second case members 301*a* and 301*b*.

An adhesive can be coated on one surface of the joint plate 395. As such, the joint plate 395 can be attached to the first case member 301*a* and the second case member 301*b* by means of the adhesive. In detail, the joint plate 395 can be attached to the horizontal plane of the first case member 301*a* and the horizontal plane of the second case member 301*b*.

A step height that can occur between the first case member 301*a* and the second case member 301*b* can be removed by the joint plate 395. When the top case 301 of the fourth embodiment is formed in the curved surface shape, the first case member 301*a* is curved in the fixed curvature but the second case member 301*b* is not curved. Due to this, the step height can be easily generated in the connection region (or joint region) of the first and second case members 301a and 301b. As such, the joint plate 395 has a large effect on the removal of the step height.

This embodiment allows the top case 301 to be used as an exterior of the LCD device. In this case, the removal of the step height can enhance the exterior of the LCD device.

The joint member 390 can include a vertical portion and a horizontal portion. Also, the joint member 390 can be formed in the shape of an 'L' by combining the vertical portion and the horizontal portion.

The vertical portion and the horizontal portion can be combined (or connected) perpendicularly to each other. Also, the vertical portion and the horizontal portion can be formed in a single body united with each other. Moreover, the vertical portion and the horizontal portion can be formed from a metal material. Furthermore, the vertical portion and the horizontal portion can be formed in a rectangular rod shape.

A plurality of fastener holes can be formed in the joint member 390. Each of the fastener holes can be formed in such a manner as to penetrate through the joint member 390. The plurality of fastener holes can be formed in the joint member 90 opposite to the plurality of case engaging holes 3.

The first and second case members 301a and 301b can be connected (or jointed) with each other by the joint member 390 and fixation members. Each of the fixation members can be inserted from the outer surface of the first or second case member 301a or 301b into the joint member 390 through the first or second case member 301a or 301b. In detail, the fixation member can penetrate through the respective case engaging hole and be inserted into the respective fastener hole.

The first and second case members 301a and 301b are primarily connected to (or combined with) each other by means of the joint plate 395, and then combined with the joint member 390 using the fixation members. As such, the efficiency of combining (or the efficiency of joining) the case members 301a-301d can be enhanced.

Also, the joint of the case members using the joint member 90 can prevent a gap that can be generated between ends of the case members 301a-301d due to mechanical tolerances such as length deviation and warping of a case member 301a, 301b, 301c, or 301d.

Moreover, the top case 301 can be used as the exterior of the LCD device without an additional covering. In this case, the joint member 390 can prevent the generation of a gap in the corner of the top case 301. Therefore, the exterior of the LCD device can be improved.

The fourth embodiment allows the top case 301 to have a curved surface shape.

In this case, the first case member 301a is curved in the fixed curvature but the second case member 301b is not curved. When connecting (or combining) the curved surface and the flat surface, it is easy to generate a gap (or crack) in the connection region (or joint region) of the first and second case members 301a and 301b. As such, the joint member 390 has a large effect on the removal of the gap (or crack).

Although it is not shown in the drawings, the receiving portion of the guide panel 80 can be modified opposite to the shape of the joint member 390, like that of the first embodiment. In other words, the receiving portion of the guide panel 80 can be formed in an intaglio shape, which is opposite to the joint member 390 and suitable to receive the joint member 390.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the detailed description.

What is claimed is:

1. A liquid crystal display device comprising:
a liquid crystal display panel;
a backlight unit configured to apply light to the liquid crystal display panel;
a top case configured to protect the liquid crystal display panel, the top case including a plurality of case members including a first case member having a first horizontal plane and second case member having a second horizontal plane;
a plurality of joint members arranged in joint regions of the plurality of case members; and
a plurality of joint plates interposed between the joint members and the case members, a joint plate including first and second wing planes combined perpendicularly to each other,
wherein a first horizontal width of the first wing plane of the joint plate equals a second horizontal width of the first horizontal plane, and a third horizontal width of the second wing plane of the joint plate equals a fourth horizontal width of the second horizontal plane.

2. The liquid crystal display device of claim 1, wherein the plurality of joint members are combined with the plurality of case members.

3. The liquid crystal display device of claim 2, wherein the plurality of joint members are combined with the plurality of case members by a plurality of fixation members.

4. The liquid crystal display device of claim 3, wherein the fixation members include a screw.

5. The liquid crystal display device of claim 1, wherein the joint member has a shape of an 'L'.

6. The liquid crystal display device of claim 1, wherein the joint member has a rectangular hexahedron shape.

7. The liquid crystal display device of claim 1, wherein the joint member comprises a metal material.

8. The liquid crystal display device of claim 1, wherein the first case member further includes a first vertical plane and the second case member includes a second vertical plane, and wherein the joint plate is interposed between a joint member and the first horizontal plane of the first case member, and the joint plate is interposed between the joint member and the second horizontal plane of the second case member.

9. The liquid crystal display device of claim 8, wherein the first vertical plane and the first horizontal plane of the first case member have a thickness of 1.5 millimeters.

10. The liquid crystal display device of claim 1, wherein the joint plate has a thickness of 0.3 millimeters.

11. The liquid crystal display device of claim 1, wherein the joint plate is attached to the first horizontal plane of the first case member and the second horizontal plane of the second case member by an adhesive.

12. The liquid crystal display device of claim 1, wherein one surface of the joint member is coated with an adhesive.

13. The liquid crystal display device of claim 12, wherein the joint member is attached to the first horizontal plane of the first case member and to the second horizontal plane of the second case member by the adhesive.

14. The liquid crystal display device of claim 1, further comprising a guide panel configured to support the liquid crystal display panel, the guide panel including a receiving portion having a flush fit with the joint member.

15. The liquid crystal display device of claim 14, wherein one surface of the joint member is level with an upper surface of the guide panel when the joint member is disposed in the receiving portion, the upper surface of the guide panel facing the first horizontal plane of the first case member and the second horizontal plane of the second case member.

16. The liquid crystal display device of claim 1, wherein the top case has a curved surface shape.

17. The liquid crystal display device of claim 1, wherein the plurality of case members include third and fourth case members, each of the first and third case members having a fixed curvature, each of the second and fourth case members having a straight shape.

18. The liquid crystal display device of claim 1, wherein the top case is an exterior of the liquid crystal display device.

19. A liquid crystal display device comprising:
   a liquid crystal display panel;
   a backlight unit configured to apply light to the liquid crystal display panel;
   a top case configured to protect the liquid crystal display panel, the top case including a plurality of case members connected at joint regions, each of the case members including a vertical inner surface and a horizontal inner surface, a first vertical inner surface of a first case member contacting a second vertical inner surface of a second case member at a joint region, a first horizontal inner surface of the first case member contacting a second horizontal inner surface of the second case member at the joint region; and
   a plurality of joint members arranged in the joint regions of the plurality of case members, a joint member of the plurality of joint members having a first surface secured onto the first vertical inner surface of the first case member, the joint member having a second surface secured onto the second vertical inner surface of the second case member.

20. The liquid crystal display device of claim 19, wherein a first fixation member secures the first surface of the joint member onto the first vertical inner surface of the first case member, and a second fixation member secures the second surface of the joint member onto the second vertical inner surface of the second case member.

* * * * *